United States Patent
Lee et al.

(10) Patent No.: US 7,864,260 B2
(45) Date of Patent: Jan. 4, 2011

(54) RECEIVING CONTAINER, METHOD OF MANUFACTURING THE SAME AND LIQUID CRYSTAL DISPLAY APPARATUS HAVING THE SAME

(75) Inventors: Jong-Nam Lee, Anyang-si (KR); Sang-Min Yi, Suwon-si (KR); Young-Bee Chu, Suwon-si (KR); Kyu-Seok Kim, Yongin-si (KR); Jeong-Min Seo, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 43 days.

(21) Appl. No.: 12/133,653

(22) Filed: Jun. 5, 2008

(65) Prior Publication Data

US 2008/0303971 A1 Dec. 11, 2008

(30) Foreign Application Priority Data

Jun. 7, 2007 (KR) ...................... 10-2007-0055613

(51) Int. Cl.
*G02F 1/1333* (2006.01)
(52) U.S. Cl. ...................................................... 349/58
(58) Field of Classification Search .................. 349/58; 362/632–634
See application file for complete search history.

(56) References Cited

U.S. PATENT DOCUMENTS

| | | | |
|---|---|---|---|
| 6,369,866 B1 * | 4/2002 | Rai et al. | 349/61 |
| 6,801,268 B2 * | 10/2004 | Huang et al. | 349/58 |
| 2007/0002206 A1 * | 1/2007 | Shirai | 349/58 |

FOREIGN PATENT DOCUMENTS

| | | |
|---|---|---|
| JP | 2002215051 | 7/2002 |
| KR | 1020030000305 | 1/2003 |
| KR | 1020050005365 | 1/2005 |

\* cited by examiner

*Primary Examiner*—Richard H Kim
(74) *Attorney, Agent, or Firm*—Cantor Colburn LLP

(57) ABSTRACT

A receiving container includes a chassis and a mold frame disposed on the chassis. The chassis includes a base plate and a sidewall having a first sidewall portion extended from the base plate and bent to extend upwards or in a first direction substantially normal to the base plate, a second sidewall portion extended from the first side sidewall portion and bent to extend downward or in a second direction opposite the first direction and an extended portion extending from the second sidewall portion in the same direction as the base plate.

20 Claims, 7 Drawing Sheets

RECEIVING CONTAINER, METHOD OF MANUFACTURING THE SAME AND LIQUID CRYSTAL DISPLAY APPARATUS HAVING THE SAME

This application claims priority to Korean Patent Application No. 10-2007-00556130, filed on Jun. 7, 2007, and all the benefits accruing therefrom under 35 U.S.C. §119, the contents of which in its entirety are herein incorporated by reference.

BACKGROUND OF THE INVENTION

1. Field of the Invention

The present invention relates to a receiving container, method of manufacturing the same and liquid crystal display apparatus having the same, and in particular, a reinforced receiving container, method of manufacturing the same and liquid crystal display apparatus having the same.

2. Description of the Related Art

A liquid crystal display ("LCD") device, which is slimmer, and lighter than a cathode-ray tube ("CRT") type display apparatus, has been developed. The LCD device provides full color and high resolution. As, a result, the LCD device is widely used as a display screen for a mobile device, a monitor of a computer, a television receiver, and other types of display devices.

A general liquid crystal display ("LCD") device comprises an LCD panel, a driving part for driving the LCD panel, a backlight assembly providing light to the LCD panel and a receiving container receiving the LCD panel and the backlight assembly.

Recently, LCD devices are getting even slimmer to increase portability and to save space. For this reason, a receiving container having low sidewalls is used in the slimmer LCD devices.

However, a receiving container having low sidewalls causes a decrease in structural strength, allowing for bending by external forces. Thus, the backlight assembly and LCD panel received in the receiving container may be damaged.

BRIEF SUMMARY OF THE INVENTION

Accordingly, the present invention is provided to substantially obviate one or more problems due to limitations and disadvantages of the related art.

It is a feature of the present invention to provide a reinforced receiving container, method of manufacturing the same and liquid crystal display apparatus having the same.

In one aspect of the present invention, a receiving container for a display device is provided. The receiving container receives a mold frame. The receiving container includes a base plate and a sidewall having a first sidewall portion extending from the base plate in a first direction substantially normal to the base plate, a second sidewall portion extending from the first side sidewall portion in a second direction opposite the first direction and an extended portion extending from the second sidewall portion in the same direction as the base plate. The extended portion faces the base plate. Also, the extended portion may be bent 180-degrees to extend in the first direction and be disposed between the first sidewall portion and the second sidewall portion. A plurality of bending portions of the sidewall disperses stress from an external force in the first sidewall portion, the second sidewall portion, the extended portion and the base plate contacting and supporting each other, so that the sidewall of the present invention provides reinforcement to the display device.

In another aspect of the present invention, a liquid crystal display is provided. The liquid crystal display device has a liquid crystal display panel, a light generating part, a light guiding part, a mold frame and a receiving container. The receiving container includes a base plate and a sidewall. The sidewall of the receiving container has a first sidewall portion extending from the base plate in a first direction substantially normal to the base plate, a second sidewall portion extending from the first sidewall portion in a second direction opposite the first direction and an extended portion extending from the second sidewall portion in the same direction as the base plate. The sidewall includes a plurality of sidewalls and an opening is formed at each corner between the sidewalls and the mold frame fills up the opening. Also a coupling hole formed on the receiving container and a protrusion formed on the mold frame is fixed into the coupling hole. According to the present invention the receiving container has a reinforced structure and the mold frame can be coupled to the receiving container more strongly.

The structure and features of the present invention can be more readily understood by persons skilled in the art from the following description of the exemplary embodiments taken in conjunction with the accompanying drawings.

BRIEF DESCRIPTION OF THE DRAWINGS

The present invention will become more apparent by describing exemplary embodiments thereof in further detail with reference to the accompanying drawing in which.

DETAILED DESCRIPTION OF THE INVENTION

Figure 1:
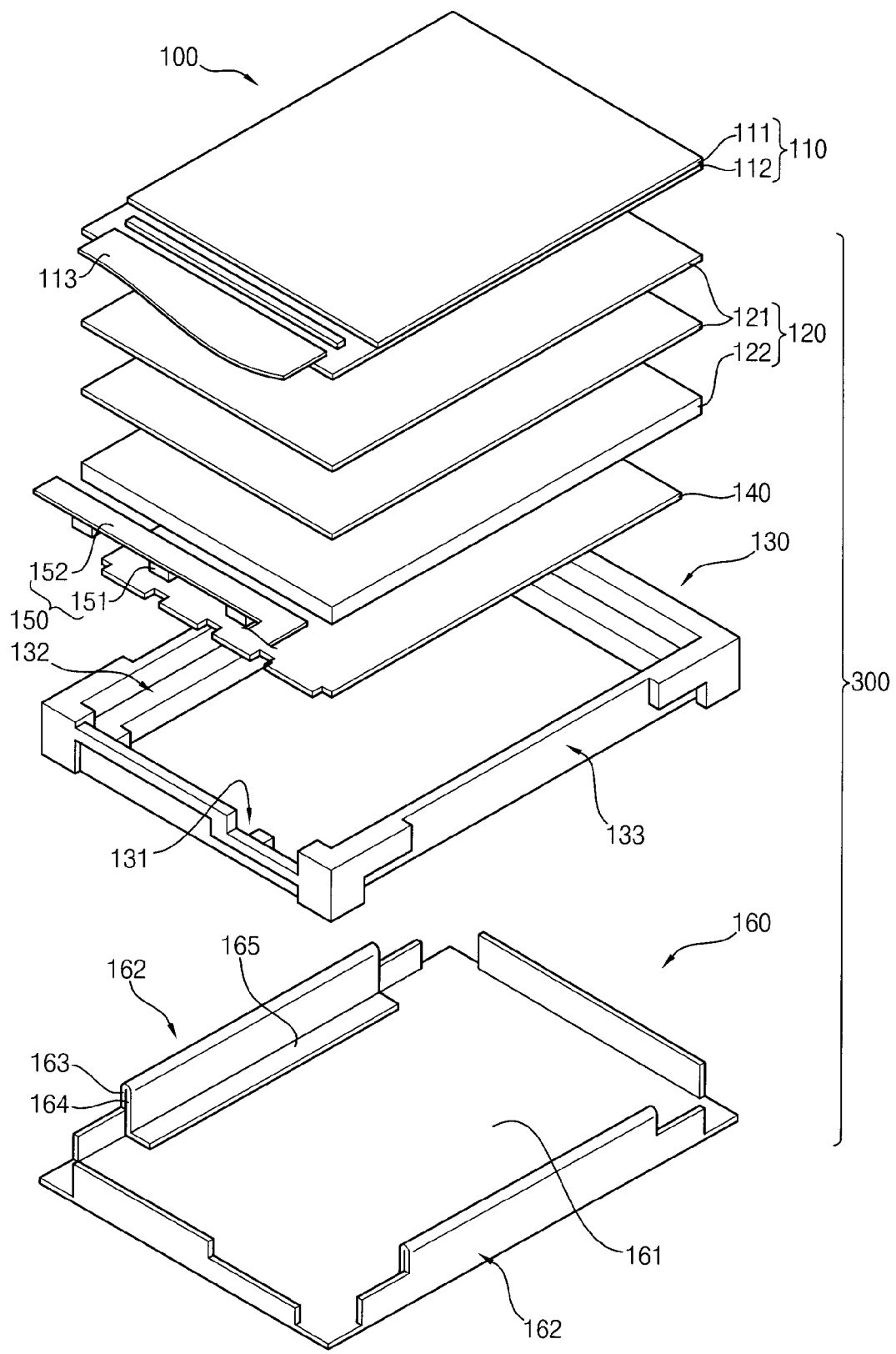
FIG. 1 is an exploded perspective view showing an LCD device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2:
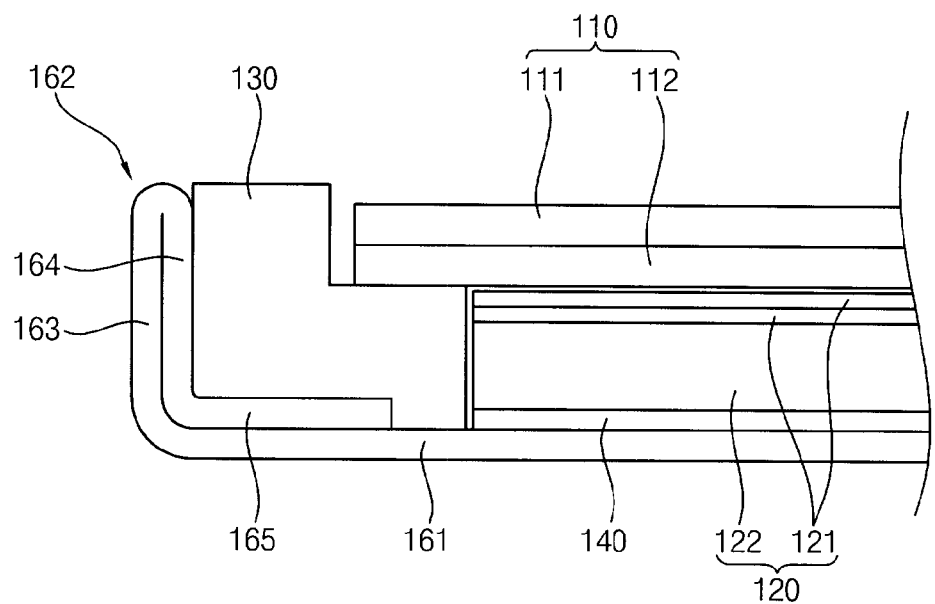
FIG. 2 is a schematic cross-sectional view showing the LCD device shown in FIG. 1 in an assembled state.

FIG. 1 is an exploded perspective view showing an LCD device according to an exemplary embodiment of the present invention and FIG. 2 is a schematic cross-sectional view showing the LCD device shown in FIG. 1 in an assembled state.

Referring to FIGS. 1 and 2, an LCD device 100 includes an LCD panel 110 for displaying an image in response to an image signal and a backlight assembly 300 for providing a light to the LCD panel 110.

The LCD panel 110 includes a color filter substrate 111, a thin-film-transistor ("TFT") substrate 112 and a liquid crystal layer (not shown) disposed between the color filter substrate 111 and the TFT substrate 112. A flexible printed circuit 113 connecting the TFT substrate 112 and a driving part (not shown) transfers image signals and driving voltages from the driving part to the TFT substrate 112.

The backlight assembly 300 includes a light guiding part 120, a mold frame 130, a reflecting sheet 140, a light generating part 150 and a chassis 160.

The light generating part 150 includes a printed circuit board 152 and at least one light emitting diode ("LED") 151 disposed on the printed circuit board 152. Both a flexible type printed circuit board and a plate type printed circuit board are applicable as the printed circuit board 152. Also, a lamp assembly may be used as the light generating part 150.

The light guiding part 120 includes a light guide plate 122 and at least one optical sheet 121. The light guide plate 122 has a light incidence surface 154 and a light emitting surface 155, and the light generating part 150 is disposed to face the light incidence surface 154. The light guide plate 122 changes and emits the light incident from the light generating part 150 to the direction where the LCD panel 110 is disposed. The optical sheet 121 disposed between the light guide plate 122 and the LCD panel 110 increases the brightness and the uniformity of the light emitted from the light emitting surface 155 of the light guide plate 122. A plurality of diffuser sheets and a plurality of prism sheets are applicable and the number and the kind of optical sheets are dependent on each special feature of each display device.

The reflecting sheet 140 disposed below the light guide plate 122 reflects the light which escapes from the light guide plate 122.

The mold frame 130 formed of a resin, such as a plastic resin, has a rectangular shape frame with an opening in the center. A plurality of grooves 131 and terraces 132 are formed on the inner surface of the mold frame 130 for receiving and supporting the light generating part 150 and the light guiding part 120. The LCD panel 110 is supported by the mold frame 130. It is also possible to use an additional frame disposed on the mold frame 130 for supporting the LCD panel 110.

The outer surface of the mold frame 130 includes grooves (or cutouts) 133 formed corresponding to the shape of the chassis 160. Said grooves 133 are formed through an insert molding process injecting a resin on the chassis 160. The chassis 160 and the mold frame 130 contacts each other more closely through the insert molding process, so that the mold frame 130 is strongly coupled to the chassis 160.

The chassis 160 is formed of a metallic material such as stainless steel and includes a base plate 161 and a plurality of sidewalls extending therefrom.

Referring to FIG. 2, two sidewalls 162 face each other (only one shown), extend substantially normal to the base plate 161 of the chassis 160 and have a plurality of bending portions. Each of the sidewalls 162 includes a first sidewall portion 163 extended from the base plate 161 and bent upwards from the base plate 161, a second sidewall portion 164 extended from the first sidewall portion 163 and bent downward and an extended portion 165 extended from the second sidewall portion 164 and overlapping the base plate 161. With this structure, the sidewall 162 having a plurality of bending portions disperses a stress from an external force in the first sidewall portion 163, the second sidewall portion 164, the extended portion 165 and the base plate 161 contacting and supporting each other, so that the sidewall 162 reinforces the display device.

The sidewall 162 is made by bending a base chassis several times.

Figure 3:
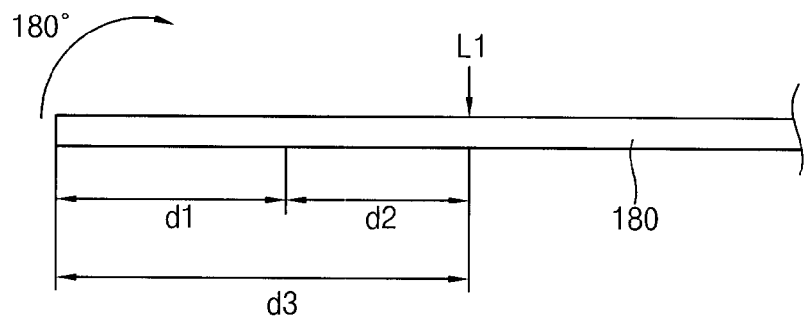
FIGS. 3 to 5 are schematic cross-sectional views showing a method of manufacturing a chassis shown in FIG. 2.
Figure 4:
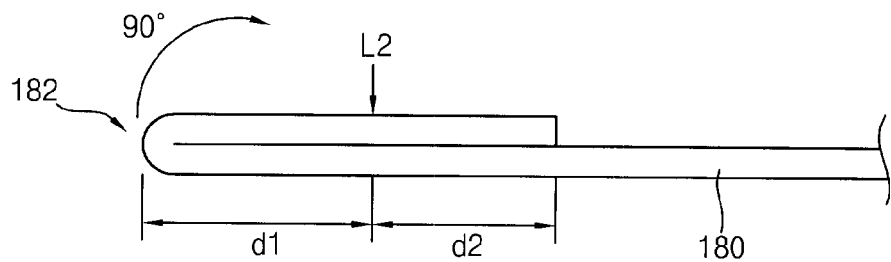
Figure 5:
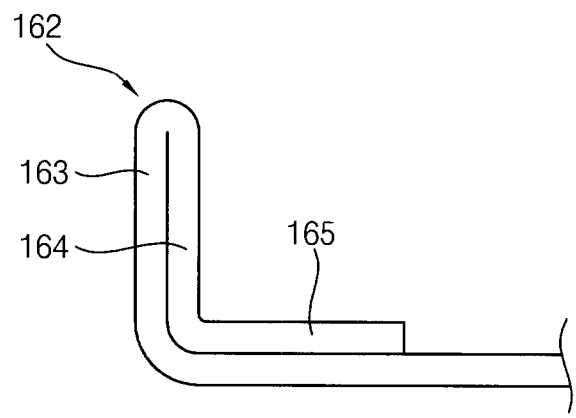

FIGS. 3 to 5 are schematic cross-sectional views showing a method of manufacturing the chassis shown in FIG. 2.

Referring to FIGS. 2 and 3, a base chassis 180 is bent 180-degrees along a first bending line L1 maintaining a distance d3, by putting together the height d1 of the sidewall 162 and the length d2 of the extended portion 165, from an edge of the base chassis 180, and forming a bending portion 182. The bending portion 182 now defines a terminal edge of the base chassis 180.

Referring to FIGS. 2 and 4, the base chassis 180 is bent 90-degrees along a second bending line L2 keeping a distance, substantially the same as the height d1 of the sidewall 162, from the bending portion 182.

Referring to FIG. 5, the sidewall 162 including the first sidewall portion 163, the second sidewall portion 164 and the extended portion 165 is completed by a bending process including a first bend along the first bending line L1 and a second bend along the second bending line L2 described above.

The mold frame 130 is formed on the chassis 160 having the sidewall 162, made by the first bend and the second bend, by insert molding including a process of disposing the chassis 160 in the injection mold and inserting a resin on the chassis 160.

Figure 6:
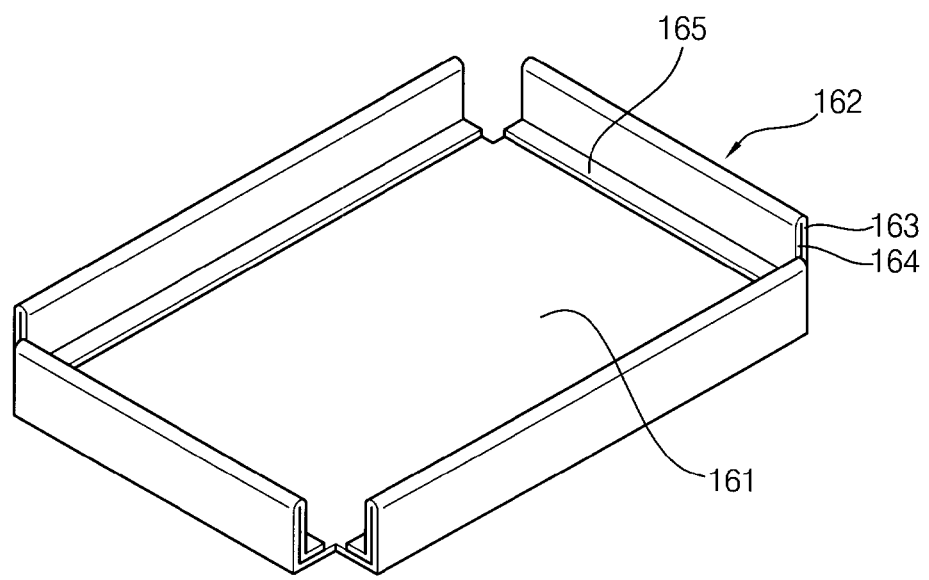
FIG. 6 is a perspective view showing a chassis according to an exemplary embodiment of the present invention.

FIG. 6 is a perspective view showing a chassis according to a preferred embodiment of the present invention.

Referring to FIGS. 1 and 6, a chassis 160 includes four sidewalls 162 having a plurality of bending portions, so that reinforcement against an external force on the chassis 160 increases. The extended portions 165 of the sidewalls 162 may not overlap each other in order to prevent increasing the thickness of the chassis 160 caused by an overlapped portion between extended portions 161.

The mold frame 130 fills up the spaces between the sidewalls 162, e.g., corners of the chassis 160. Therefore, the contact area between the mold frame 130 and the chassis 160 is increased, so that the mold frame 130 is coupled to the chassis 160 more strongly.

Figure 7:
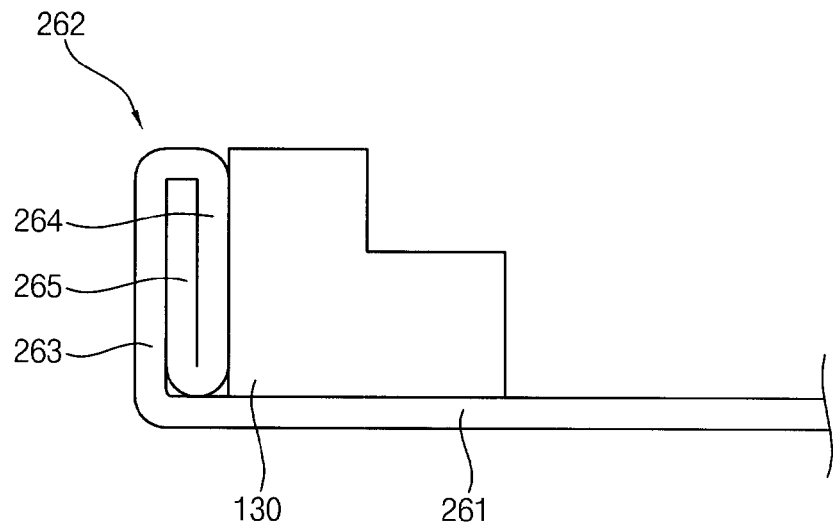
FIG. 7 is a schematic cross-sectional view showing an assembled structure between a chassis and a mold frame according to an exemplary embodiment of the present invention.

FIG. 7 is a schematic cross-sectional view showing an assembled structure between a chassis and a mold frame according to another exemplary embodiment of the present invention.

Referring to FIG. 7, an extended portion 265 is extended from a second sidewall portion 264 and bent 180-degrees upward. The extended portion 265 is disposed between the first sidewall portion 263 and the second sidewall portion 264, so that the reinforcement of the sidewall is increased. Although the second sidewall portion 262 shown in FIG. 7 is bent 180-degrees to the inside of the chassis 260, it is possible to bend the second sidewall portion 262 180-degrees to the outside of the chassis 260.

FIGS. 8 to 11 are schematic cross-sectional views showing a method of manufacturing the chassis shown in FIG. 7.

Figure 8:
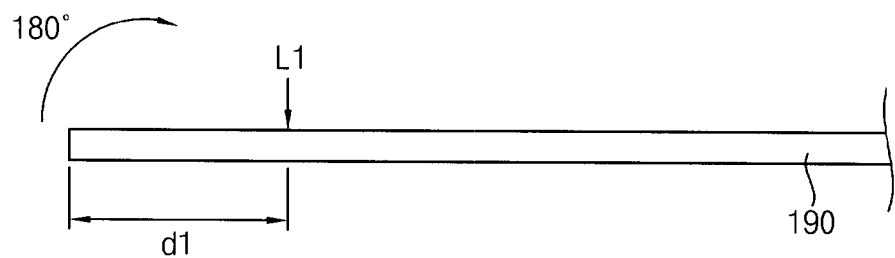
FIGS. 8 to 11 are schematic cross-sectional views showing a method of manufacturing the chassis shown in FIG. 7.

Referring to FIGS. 7 and 8, a base chassis 190 is bent 180-degrees along a first bending line L1 maintaining a distance d1, substantially same as the height of the sidewall 262, from an edge of the base chassis 190 forming a first bending portion 192.

Figure 9:
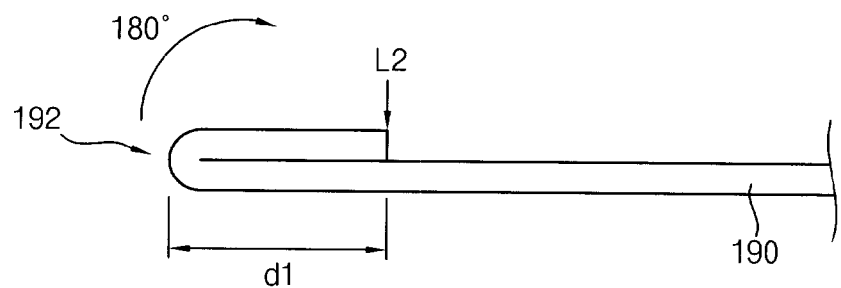

Referring to FIGS. 7 and 9, the base chassis 190 is bent 180-degrees along a second bending line L2 maintaining the distance d1 from the first bending portion with forming a second bending portion 194.

Figure 10:
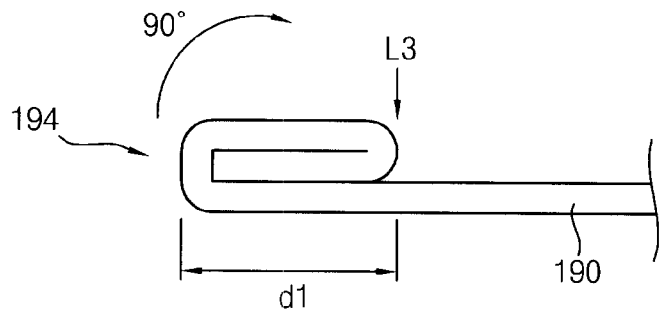

Referring to FIGS. 7 and 10, the base chassis 190 is bent 90-degrees along a third bending line L3 maintaining the distance d1 from second bending portion 194.

Figure 11:
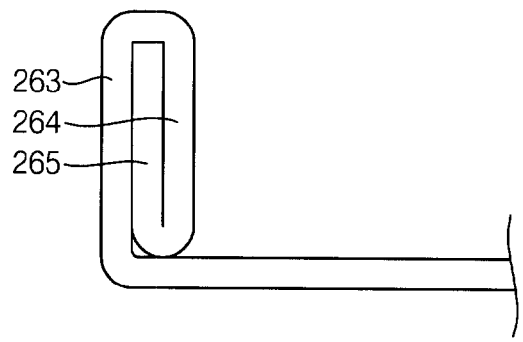

Referring to FIG. 11, the sidewall 262 including the first sidewall portion 263, the second sidewall portion 264 and the extended portion 265 disposed between the first sidewall portion 263 and the second sidewall portion 264 is completed by the third bending along the third bending line L3 described above.

Figure 12:
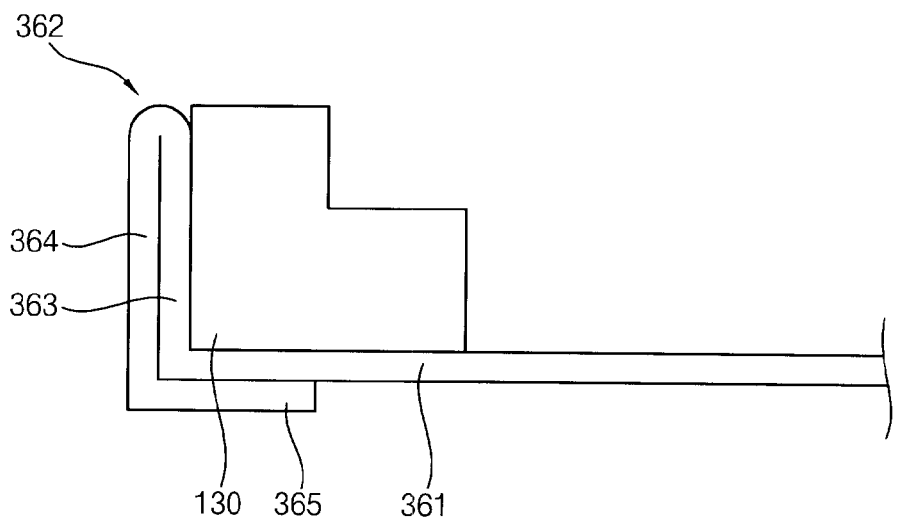
FIG. 12 is a schematic cross-sectional view showing an assembled structure between a chassis and a mold frame according to an exemplary embodiment of the present invention.

FIG. 12 is a schematic cross-sectional view showing an assembled structure between a chassis and a mold frame according to an exemplary embodiment of the present invention.

Referring to FIG. 12, a sidewall 362 of a chassis 360 includes a first sidewall portion 363 extended from a base plate 361 and bent upward, a second sidewall portion 364 extended from the first sidewall portion 363 and bent downward and an extended portion 365 extended from the second sidewall portion 364 and overlapping the base plate 361. The second sidewall portion 364 is bent outside of the chassis 360, so that the inner surface of the second sidewall portion 364 contacts the outer surface of the first sidewall portion 363. The extended portion 365 is disposed below the base plate 361. Therefore, the inside of the chassis 360 has a smooth surface without any groove or protrusion and it is possible for the chassis 360 to receive a mold frame 130 already made without insert molding, as illustrated.

Figure 13:
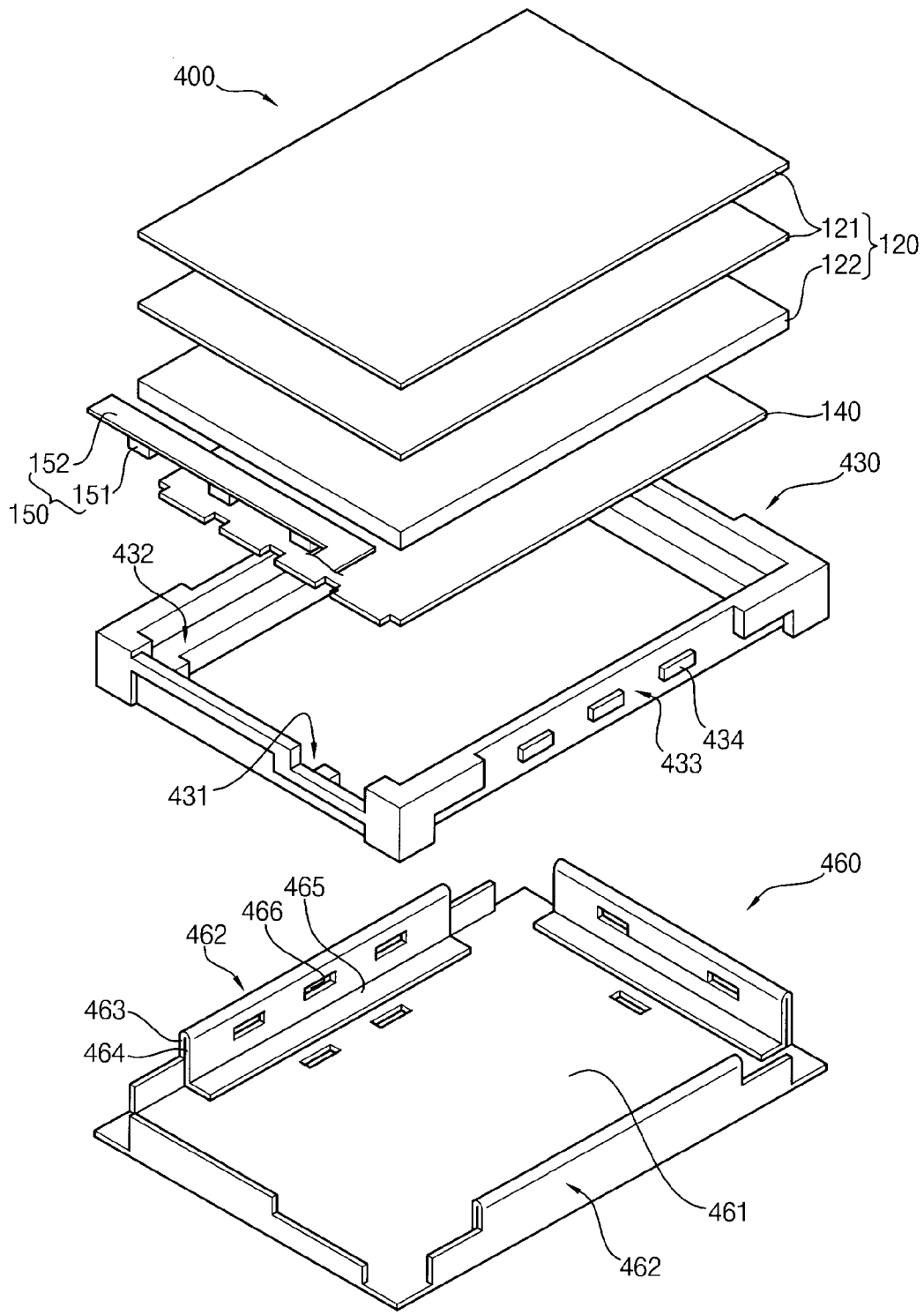
FIG. 13 is an exploded perspective view showing a backlight assembly according to an exemplary embodiment of the present invention.
Figure 14:
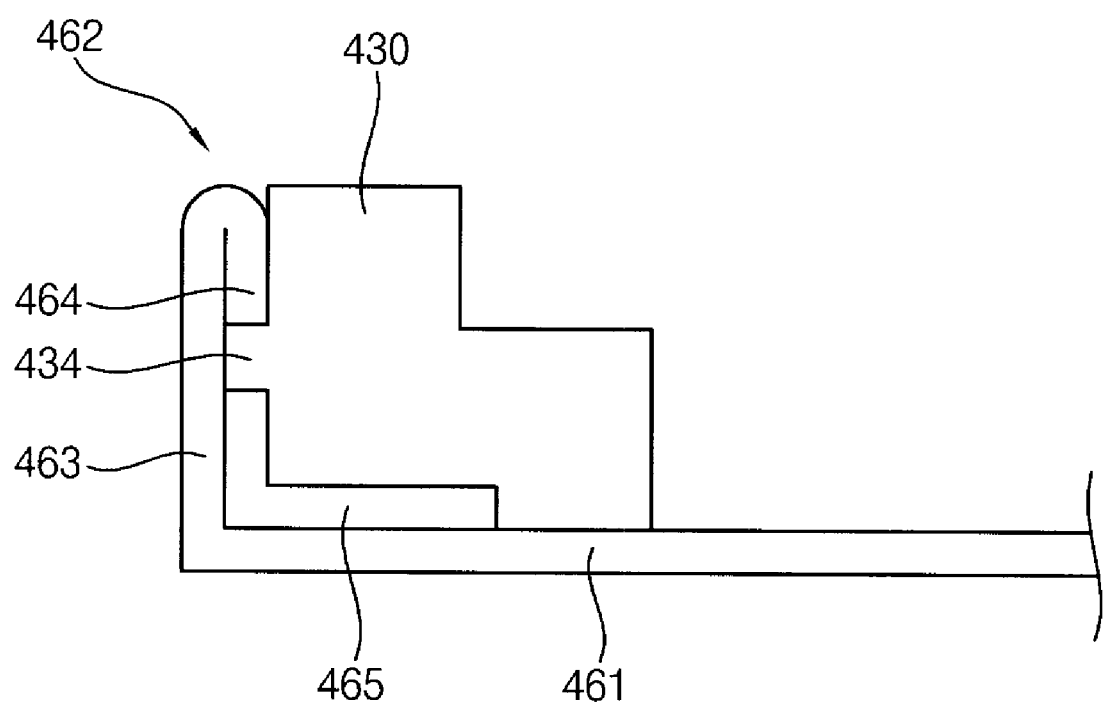
FIG. 14 is a schematic cross-sectional view showing an assembled structure between the chassis and the mold frame shown in FIG. 13.

FIG. 13 is an exploded perspective view showing a backlight assembly according to an exemplary embodiment of the present invention. FIG. 14 is a schematic cross-sectional view showing an assembled structure between the chassis and the mold frame shown in FIG. 13.

Referring to FIG. 13, a backlight assembly 400 includes a light guiding part 120, a reflecting sheet 140 disposed below the light guiding part 120, a light generating part 150 disposed at a side of the light guiding part 120, a mold frame 430 and a chassis 460. The structure and function of the light guiding part 120, the reflecting sheet 140 and the light generating part 150 are substantially the same as the structure and function of the corresponding units which have the same reference numbers shown in FIG. 1.

The mold frame 430 supports the light guiding part 120 and the reflecting sheet 140, and is received in the chassis 460. The mold frame 430 includes a protrusion 434 formed to be coupled to the chassis 460.

The chassis 460 includes a base plate 461, a sidewall 462 having a plurality of bending portions and a hole 466. The sidewall 462 includes a first sidewall portion 463 extended from the base plate 461 and bent upward, a second sidewall portion 464 extended from the first sidewall portion 463 and bent downward and an extended portion 465 extended from the second sidewall portion 464 and overlapping the base plate 461. The extended portion 465 should not overlap the reflecting sheet 140 in order to provide better efficiency of the light reflected from the reflecting sheet 140. The extended portion 465 is enclosed by the mold frame 430 to prohibit the extended portion 465 from being exposed through the opening of the mold frame 430.

Referring to FIG. 14, the protrusion 434 formed on the outer surface of the mold frame 430 is coupled to the hole 466 formed on the first sidewall portion 464 of the chassis 460, so that the mold frame 430 is coupled to the chassis 460 more strongly. The hole 466 may also be formed on other sidewalls, the base plate 461 and/or the extended portion 465.

Having described the exemplary embodiments of the present invention and its aspects features and advantages, it is noted that various changes, substitutions and alternations can be made herein without departing from the spirit and scope of the invention as defined by the appended claims.

What is claimed is:

1. A receiving container for receiving a mold frame, the receiving container comprising:
    a base plate;
    a first sidewall portion extending from the base plate in a first direction substantially normal to the base plate;
    a second sidewall portion extending from the first sidewall portion in a second direction opposite the first direction; and
    an extended portion extending from the second sidewall portion in the same direction as the base plate,
    wherein at least one of the second sidewall portion and the extended portion makes surface contact with the first sidewall portion.

2. The receiving container of claim 1, wherein the second sidewall portion is bent inwardly 180-degrees and faces an inner surface of the first sidewall portion.

3. The receiving container of claim 2, wherein the extended portion faces a top surface of the base plate.

4. The receiving container of claim 1, wherein the second sidewall portion is bent outwardly 180-degrees and faces an outer surface of the first sidewall portion.

5. The receiving container of claim 4, wherein the extended portion faces a bottom surface of the base plate.

6. The receiving container of claim 1, wherein the extended portion is bent upwardly 180-degrees to extend in the first direction and is disposed between the first sidewall portion and the second sidewall portion.

7. The receiving container of claim 1, further comprising:
    a coupling hole formed on one of the first sidewall portions, the second sidewall portion and the extended portion; and
    a protrusion formed on the mold frame which fits into the coupling hole.

8. The receiving container of claim 1, further comprising:
    a coupling hole formed on the base plate; and
    a protrusion formed on the mold frame which fits into the coupling hole.

9. The receiving container of claim 1, wherein a first sidewall comprises the first sidewall portion, the second sidewall portion and the extended portion and the receiving container further comprises a second sidewall wherein an opening is formed at a corner between the first sidewall and the second sidewall and the mold frame fills up the opening.

10. A method of forming a receiving container for receiving a mold frame, the receiving container having a base plate, the method comprising:
    forming a first sidewall portion extending from the base plate in a first direction substantially normal to the base plate;
    forming a second sidewall portion extending from the first sidewall portion in a second direction opposite the first direction; and
    forming an extended portion extending from the second sidewall portion in the same direction as the base plate,
    wherein at least one of the second sidewall portion and the extended portion makes surface contact with the first sidewall portion.

11. A liquid crystal display device comprising:
    a liquid crystal display panel;
    a light generating part having at least one light source;
    a light guiding part including a light guide plate which guides the light emitted from the light generating part and a optical sheet disposed between the light guide plate and the liquid crystal display panel;
    a mold frame which receives the light generating part, and the light guiding part; and
    a receiving container which receives the mold frame, the receiving container comprising:
        a base plate; and
        a sidewall extending from the base plate; the sidewall comprising:
            a first sidewall portion extending from the base plate in a first direction substantially normal to the base plate;
            a second sidewall portion extending from the first sidewall portion in a second direction opposite the first direction; and
            an extended portion extending from the second sidewall portion in the same direction as the base plate,
    wherein at least one of the second sidewall portion and the extended portion makes surface contact with the first sidewall portion.

12. The liquid crystal display device of claim 11, wherein the second sidewall portion is bent inwardly 180-degrees and an inner surface of the first sidewall portion.

13. The liquid crystal display device of claim 11, wherein the second sidewall portion is bent outwardly 180-degrees and faces an outer surface of the first sidewall portion.

14. The liquid crystal display device of claim 11, wherein the sidewall includes a plurality of sidewalls and an opening is formed at each corner between the sidewalls and the mold frame fills up the opening.

15. The liquid crystal display device of claim 11, further comprising:
    a coupling hole formed on at least one of the sidewalls; and
    a protrusion formed on the mold frame which is fixed into the coupling hole.

16. The liquid crystal display device of claim 11, further comprising:
    a coupling hole formed on the extended portion; and
    a protrusion formed on the mold frame which is fixed into the coupling hole.

17. The liquid crystal display device of claim 11, further comprising:
    a coupling hole formed on the base plate; and
    a protrusion formed on the mold frame which is fixed into the coupling hole.

18. The liquid crystal display device of claim 11, wherein a plurality of grooves and terraces are formed on the inner surface of the mold frame for receiving the light generating part and the light guiding part.

19. The liquid crystal display device of claim 11, wherein the extended portion is enclosed by the mold frame.

20. The liquid crystal display device of claim 11, further comprising a reflecting sheet disposed between the light guide plate and the receiving container.

* * * * *